United States Patent
Alfano et al.

(10) Patent No.: US 9,528,489 B2
(45) Date of Patent: Dec. 27, 2016

(54) DEVICE FOR HEATING A HEAT ENGINE OF A VEHICLE

(71) Applicant: Valeo Systemes de Controle Moteur, Cergy Saint Christophe (FR)

(72) Inventors: Damien Alfano, Le Pecq (FR); Pauline Lartigue, Argenton (FR); Thierry Cheng, Les Brevieres (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 22 days.

(21) Appl. No.: 14/376,197

(22) PCT Filed: Jan. 31, 2013

(86) PCT No.: PCT/FR2013/050203
§ 371 (c)(1),
(2) Date: Aug. 1, 2014

(87) PCT Pub. No.: WO2013/114046
PCT Pub. Date: Aug. 8, 2013

(65) Prior Publication Data
US 2015/0000624 A1    Jan. 1, 2015

(30) Foreign Application Priority Data
Feb. 3, 2012 (FR) .................................... 12 51014

(51) Int. Cl.
*F02N 19/10* (2010.01)
*F24J 1/00* (2006.01)
(Continued)

(52) U.S. Cl.
CPC .............. *F02N 19/10* (2013.01); *F02N 19/02* (2013.01); *F02N 19/04* (2013.01); *F24J 1/00* (2013.01);
(Continued)

(58) Field of Classification Search
CPC .......... F02N 19/10; F02N 19/04; F02N 19/02; F01N 5/02; F28D 20/003; F24J 1/00; Y02E 60/142
(Continued)

(56) References Cited

U.S. PATENT DOCUMENTS 4,343,770 A * 8/1982 Simons .................. B01D 53/02
                                                    123/DIG. 12
4,816,121 A * 3/1989 Keefer .................. B21D 39/04
                                                    204/156
(Continued)

FOREIGN PATENT DOCUMENTS

DE    199 00 965 A1    7/2000
EP    1 331 113 A1     7/2003
(Continued)

OTHER PUBLICATIONS

International Search Report for corresponding International Application No. PCT/FR2013/050203, mailed Jun. 12, 2013 (3 pages).

*Primary Examiner* — Lindsay Low
*Assistant Examiner* — Grant Moubry
(74) *Attorney, Agent, or Firm* — Osha Liang LLP

(57) ABSTRACT

The invention relates to a device for heating the heat engine (7) of a vehicle, comprising: a reactor (3) in which a reagent that can cause an exothermic reaction with a reaction fluid is disposed, a circuit (5) for supplying reaction fluid to the reactor (3), a heat-exchange circuit (8) between the reactor (3) and the heat engine (7) of the vehicle, and a circuit (9) for regenerating the reagent.

12 Claims, 3 Drawing Sheets

Figure 2:
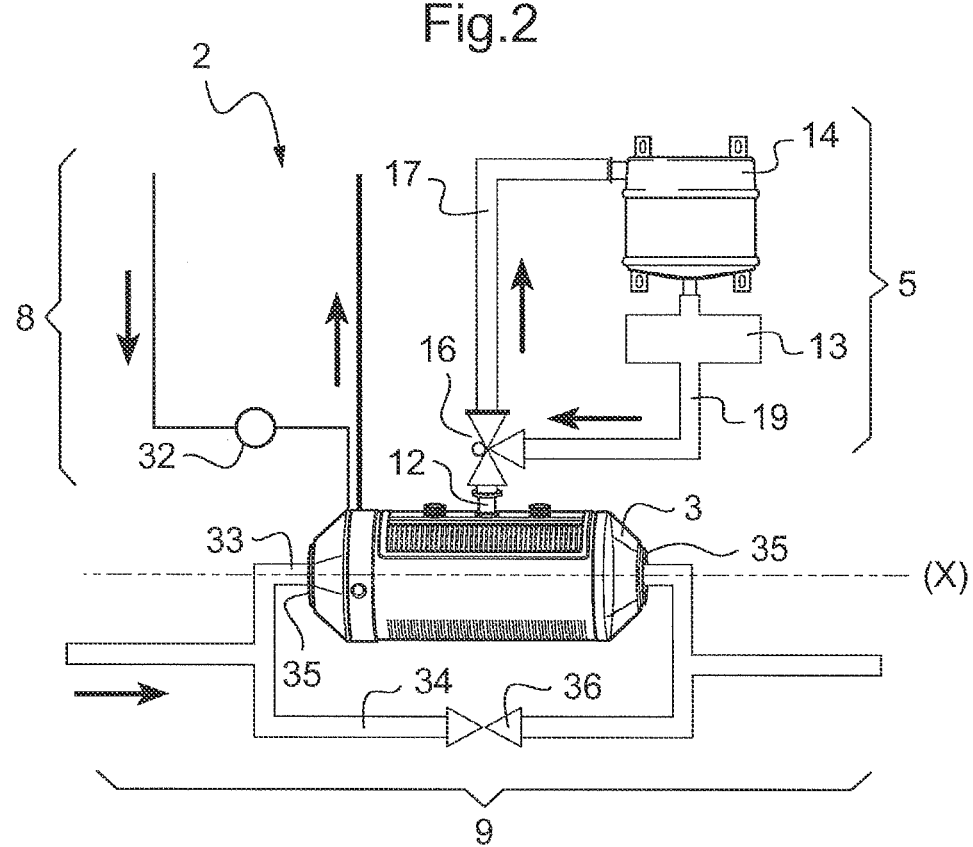

(51) Int. Cl.
*F02N 19/02* (2010.01)
*F02N 19/04* (2010.01)
*F28D 20/00* (2006.01)
*F01N 5/02* (2006.01)

(52) U.S. Cl.
CPC ............... *F28D 20/003* (2013.01); *F01N 5/02* (2013.01); *Y02E 60/142* (2013.01)

(58) Field of Classification Search
USPC ................. 123/142.5 R; 165/104.28; 60/320
See application file for complete search history.

(56) References Cited

U.S. PATENT DOCUMENTS

| | | |
|---|---|---|
| 5,398,747 A | 3/1995 | Miaoulis |
| 5,653,106 A | 8/1997 | Katashiba et al. |
| 2011/0226447 A1* | 9/2011 | Mieda .................... F28D 7/022 165/104.12 |

FOREIGN PATENT DOCUMENTS

| | | |
|---|---|---|
| EP | 1 391 238 A2 | 2/2004 |
| JP | 57-41465 A | 3/1982 |
| JP | 61-263824 A | 11/1986 |

\* cited by examiner

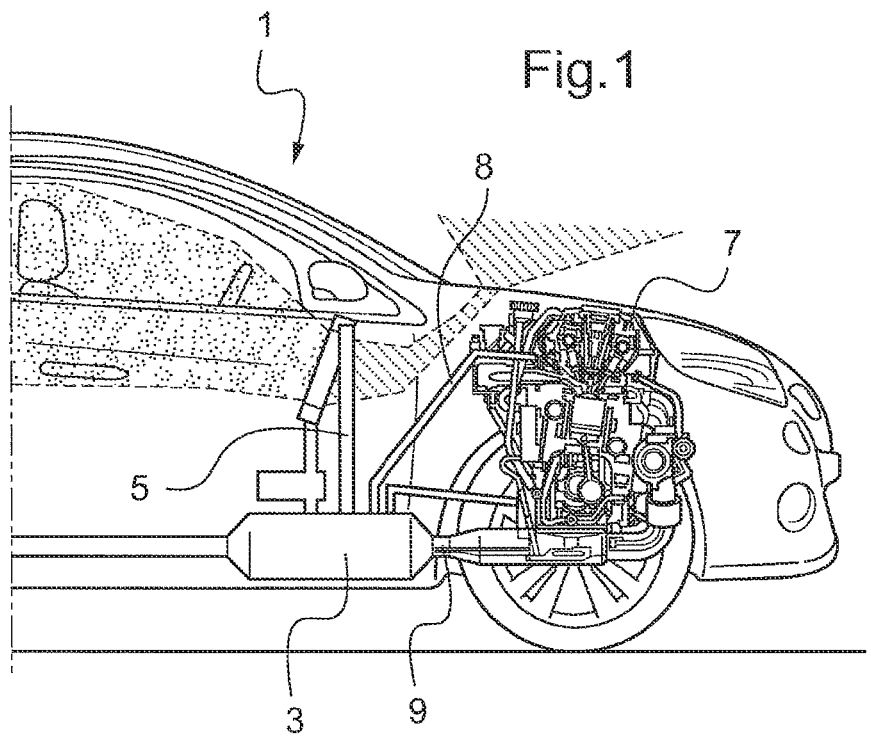
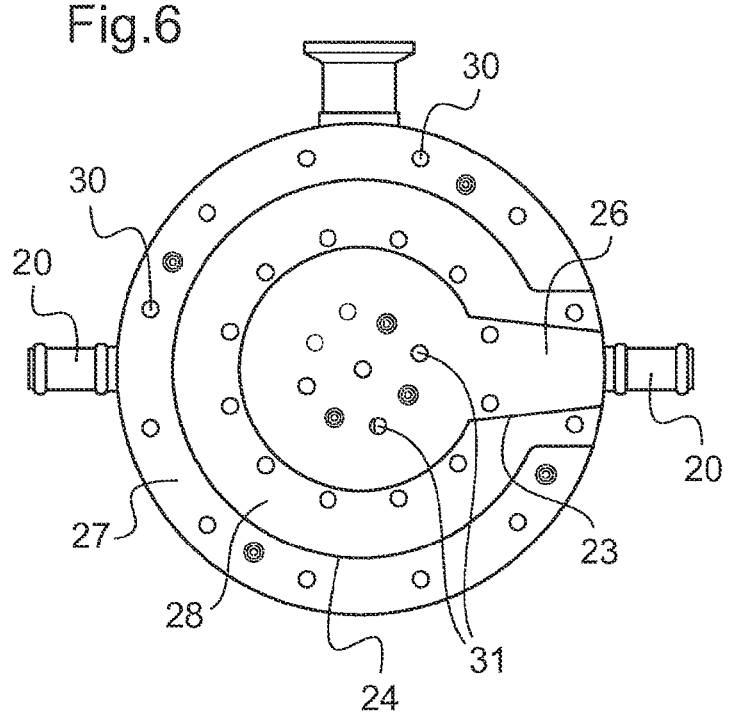

DEVICE FOR HEATING A HEAT ENGINE OF A VEHICLE

The present invention relates to the heating of at least one component of a vehicle. The invention applies in particular, although not exclusively, to the heating of a heat engine during start-up, for example an internal combustion engine.

Heating the heat engine when it starts may permit the petrol consumption and/or the pollutant emissions to be reduced. This heat may also be transmitted to the passenger compartment, under very cold conditions, in order to improve the comfort of the users of the vehicle.

Existing solutions for heating a heat engine during start-up of a vehicle include, for example: the utilization of a glow plug, the encapsulation of the engine, the enrichment of the air/fuel mixture in order more rapidly to obtain better performance from the engine, the use of external elements for heating attached to the base of the engine block, the utilization of an immersion heater immersed in the oil of the engine block.

These different solutions are not really satisfactory in terms of consumption and/or cost and/or service life and/or efficiency of the transfer of heat to the heat engine.

Also known, furthermore, are reagents, such as zeolite, with the ability to react in a strongly exothermic manner with a reaction fluid and to be regenerated subsequently.

An example of a device permitting the use of these reagents for the heating of components of a heat engine is disclosed in application EP 1 391 238. According to this device, the transfer of the heat released by the exothermic reaction and the regeneration of the reagent are carried out with the help of the same circuit carrying the engine coolant. Such a fluid is not suited to withstand high temperatures, however, and its pressure is too great, so that this device has disadvantages in terms of complexity and cost. Furthermore, there are major risks of degrading the coolant.

Also known from application EP 1 331 113, furthermore, is a device for air conditioning the passenger compartment of a vehicle, the device utilizing zeolite. This device does not permit the engine to be heated with the help of the exothermic reaction produced when the zeolite reacts with water.

The need exists to permit the use of such reagents for heating components of vehicles, and in particular their heat engine.

The object of the invention is to meet this need and it accomplishes this object, as claimed in one of its aspects, with the help of a device for heating at least one component of a vehicle, in particular the heat engine of the vehicle, comprising:
 a reactor, in which a reagent with the ability to bring about an exothermic reaction with a reaction fluid is disposed,
 a circuit for the supply of reaction fluid to the reactor,
 a circuit for the exchange of heat between the reactor and the component of the vehicle, and
 a circuit for regenerating the reagent,
the circuit for the exchange of heat and the regeneration circuit being separate and each comprising a part extending into the reactor.

The reactor may thus be described as a "three fluids" reactor receiving three fluids, each having a separate function, namely:
 the reaction fluid reacting with the reagent,
 the exchange fluid circulating between the reactor and the component to be heated in order to transfer the heat released by the reaction, and
 the regeneration fluid regenerating the reagent and, where appropriate, the reaction fluid.

The three circuits above may be separate, that is to say they do not exhibit any parts in common. Each of these circuits may thus be dedicated to the one or more functions that it is required to perform.

The circuit for the exchange of heat permits in particular the heat of the exothermic reaction to be transferred to the component to be heated, in particular to the heat engine.

The device provides an architecture that is suitable for the release of heat by the reaction of the reagent, for the transfer of this heat to the component to be heated and for the regeneration of the reagent.

The reagent may be zeolite, and the reaction fluid may be water. In the sense of the present invention, the expression "water" is used to designate both pure water and a mixture of water and one or a plurality of other components in smaller proportions. An example of such a mixture is a glycol/water solution. The reaction involving the adsorption of water by the anhydrous zeolite is highly exothermic, the zeolite having in particular a mass storage capacity of 300 kWh for 1 kg of zeolite.

The zeolite may be present in the form of balls stacked inside the reactor.

The zeolite may be anhydrous before the reaction with the reaction fluid.

The circuit for the regeneration of the reagent may form a part of the exhaust system of the engine. In this case, the regeneration fluid travelling through the regeneration circuit is constituted by the exhaust gases.

The exhaust system may not have a burner positioned therein, in particular upstream of the reactor, such a burner permitting reheating of the exhaust gases.

The regeneration circuit may comprise, in parallel with the part extending into the reactor, a part bypassing the reactor.

The circuit for the supply of reaction fluid may comprise a condenser and a pipe connecting the reactor to the condenser.

The circuit for the supply of reaction fluid may also comprise a reservoir that is suitable to store the reaction fluid. This reservoir may be disposed vertically in relation to the reactor in such a way that the reaction fluid that is present in the reservoir in liquid form is able to flow by gravity into the reactor in order to bring about its adsorption by the reagent.

The condenser may be disposed vertically in relation to the reservoir in such a way that the reaction fluid that is present in the condenser in liquid form may flow by gravity into the reservoir.

The part of the circuit for the supply of reaction fluid between the reservoir and the reactor may be flowed through by the fluid in the liquid phase when it is wished to bring about the exothermic adsorption reaction, and the part of the circuit for the supply of reaction fluid comprising the condenser and the pipe may be flowed through by the fluid when this is desorbed from the reagent during regeneration of the latter. The fluid may then travel through the pipe in the gaseous phase, condense in the condenser and then arrive in the reservoir, in particular by gravity. Such a circuit permits the regeneration of both the reagent and the reaction fluid, so that these latter will be suitable to react together again in the event of it subsequently becoming necessary to heat the component.

Furthermore, the heat produced by the condensation of the fluid in the condenser may be reutilized, for example for heating the passenger compartment of the vehicle.

The pipe used by the reaction fluid in the gaseous phase between the reactor and the condenser may extend vertically from the reactor and may be disposed in proximity to a source of heat. The risks of the fluid that is desorbed from the zeolite and uses this pipe condensing and falling by gravity back into the reactor before having reached the condenser are reduced in this way.

The reagent may be received in a compartment of the reactor.

This compartment may be unique.

The reservoir may contain a volume of reaction fluid, in particular of water, corresponding to 20% of the total mass in the anhydrous phase of the zeolite in the compartment. This volume of the reservoir may be sufficiently large to guarantee an exothermic reaction that is sufficient for heating the component.

The condenser may be dimensioned in order to permit a rapid regeneration of the zeolite, for example in less than twenty minutes.

In one illustrative embodiment of the invention, the circuit for the exchange of heat may be flowed through by a single exchange fluid. This exchange fluid then takes up heat inside the reactor when the exothermic reaction takes place there and transfers it to the component. When the component to be heated is the heat engine of the vehicle, the exchange fluid may be the coolant fluid, in particular a liquid.

In this example, a system for emptying the part of the circuit for the exchange of heat inside the reactor may be included in order to prevent the exchange fluid, which may be the coolant for the engine, from being subjected to high temperatures inside the reactor during regeneration of the reagent. These temperatures may in effect be in the order of 150° C., or even more, and the engine coolant fluids may not be suitable for such temperatures.

In another illustrative embodiment of the invention, the circuit for the exchange of heat may comprise two sub-circuits separated by a heat exchanger. This can be a heat exchanger of the "stacked plate engine oil cooler" type, for example.

In this example, a first exchange fluid may circulate in a first sub-circuit between the component of the vehicle and the said heat exchanger, and a second exchange fluid may circulate in a second sub-circuit between the reactor and the said heat exchanger. Such a structure allows each sub-circuit to be flowed through by its own exchange fluid that is also appropriate for the environment in which it is circulating.

The first sub-circuit is flowed through by a glycol/water solution, for example, in particular when the component to be heated is the heat engine, and the second sub-circuit is flowed through by a synthetic oil, for example.

The second sub-circuit may in addition comprise a pump.

In the above two illustrative embodiments, the circuit for the exchange of heat may comprise a part bypassing the reactor and disposed in parallel with the part of the said circuit inside the reactor, and a valve may be disposed in the inlet of the said part bypassing the reactor. For example, this can be a three-way valve disposed at the level of the bifurcation between the said parts in parallel and capable, according to its status, of permitting the exchange fluid to be directed into one and/or other of the parts in parallel of the said circuit or into each of these parts.

The circuit for the supply of a reaction fluid may communicate with the interior of the reactor via the intermediary of a valve, in particular a three-way valve. This valve may or may not permit the passage of the reaction fluid in the liquid phase of the reservoir from the circuit for the supply of a reagent to the reactor and may or may not permit the passage of the reaction fluid in the gaseous phase of the reactor to the pipe of the said supply circuit.

The regeneration circuit may furthermore comprise a valve, of which the status does or does not permit the circulation of fluid through the part bypassing the reactor. Where appropriate, the access of the regeneration fluid to the part of the regeneration circuit disposed inside the reactor may be conditioned to the status of another valve of the regeneration circuit.

The circuit for the exchange of heat between the component and the reactor may comprise a valve upstream of its part inside the reactor, the status of this valve controlling the circulation of exchange fluid in the said part.

When it is wished to cause the reaction fluid and the reagent to react in order to bring about the exothermic reaction, the valve of the supply circuit may be controlled in order for it to have a status permitting the passage of the reaction fluid by gravity from the reservoir to the reactor and preventing the access of this fluid to the condenser via the pipe. The status of the valve of the exchange circuit controlling the admission of the exchange fluid into the part of the said circuit inside the reactor may be controlled according to the quantity of exchange fluid that it is wished to heat inside the reactor, for example according to the number of components of the vehicle to be heated and/or the nature thereof.

The valve of the regeneration circuit controlling the passage of regeneration fluid into the part bypassing the reactor may be open or closed when the exothermic reaction takes place. When this valve is open, it may or may not be completely open.

When it is wished to regenerate the reagent, the valve of the supply circuit may be controlled in order to permit the passage of the reaction fluid in gaseous form into the pipe and then into the condenser and in order to prevent the direct passage of this reaction fluid in the gaseous phase into the reservoir from the reactor. The valve of the circuit for the exchange of heat controlling the passage of exchange fluid into the part inside the reactor may or may not be closed at this time. For example, when a single exchange fluid is circulating in the circuit for the exchange of heat, this valve may be closed in order to prevent degradation of the fluid. Conversely, when this part inside the reactor is being flowed through by the second exchange fluid, this valve may be open in order to permit the circulation of this fluid and to prevent it from being heated locally.

The valve of the regeneration circuit controlling the passage of regeneration fluid into the part bypassing the reactor may be closed. In certain cases, this latter valve may be fully or partly open during regeneration of the reagent in order to limit the temperature inside the reactor.

When the reaction fluid is stored in the reservoir, the valve of the supply circuit may be controlled in such a way that the fluid is unable to leave the reservoir and the above valves of the circuit for the exchange of heat and of the regeneration circuit may be open.

Inside the reactor, the part of the circuit for the exchange of heat may be present in the form of a plurality of second pipes, the said part of the exchange circuit possibly comprising bands of second pipes, and the part of the regeneration circuit may be present in the form of a plurality of first pipes.

The first and second pipes may extend in an essentially parallel manner inside the reactor.

The compartment receiving the reagent may be formed by the gaps between the said pipes passing through the reactor.

The invention also has as its object, according to another of its aspects, a method for heating at least one component of a vehicle with the help of the device defined above, in which:

the reagent inside the reactor is supplied with reaction fluid in such a way as to bring about an exothermic reaction inside the reactor, and the heat released by the said reaction is transferred to the component with the help of the circuit for the exchange of heat.

The method may include the stage according to which the reagent is regenerated by causing regeneration fluid, in particular exhaust gases, to circulate in the regeneration circuit.

The component may be at least one of: the heat engine of the vehicle, the gearbox, a defrosting system and a system for air conditioning and/or for heating the passenger compartment, a system for cleaning/wiping the window(s) of the vehicle or a battery of the vehicle.

The method may be implemented during start-up of the heat engine, in particular in order to heat the latter.

As a variant, the method may be implemented prior to start-up of the engine, the latter not necessarily being a heat engine in this case. The implementation of the method may be performed in response to an instruction given by the user of the vehicle or may be automatic, for example after detection of an action on the part of the user, such as the unlocking of the doors of the vehicle, the insertion of the ignition key or the opening of a door of the vehicle, for example.

The method thus permits the preconditioning of certain components of the vehicle. This preconditioning may permit defrosting the windows of the vehicle or heating the oil in the gearbox, for example. This preconditioning may, in addition or as a variant, permit heating the oil or the water in the engine and/or the passenger compartment of the vehicle and/or the product for cleaning/wiping the window (s) of the vehicle.

All or part of the characteristics mentioned above in connection with the heating device are applicable to the above method of heating.

The invention also has as its object, according to another of its aspects, a device for heating at least one component of a vehicle, comprising:

a reactor, inside which a reagent with the ability to bring about an exothermic reaction with a reaction fluid is disposed, a circuit for the supply of a reaction fluid to the reactor, a circuit for the exchange of heat between the reactor and the component of the vehicle, and a regeneration circuit for the reagent, the said circuit comprising in parallel a part passing through the reactor and a part bypassing the reactor.

All or some of the features mentioned above in connection with the method are applicable to the above device.

Figure 3:
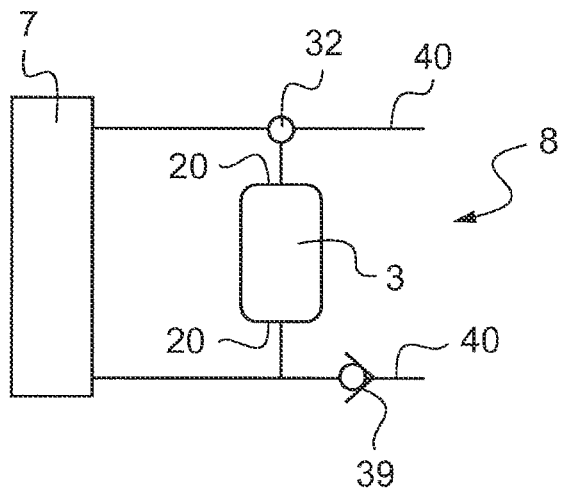
Figure 4:
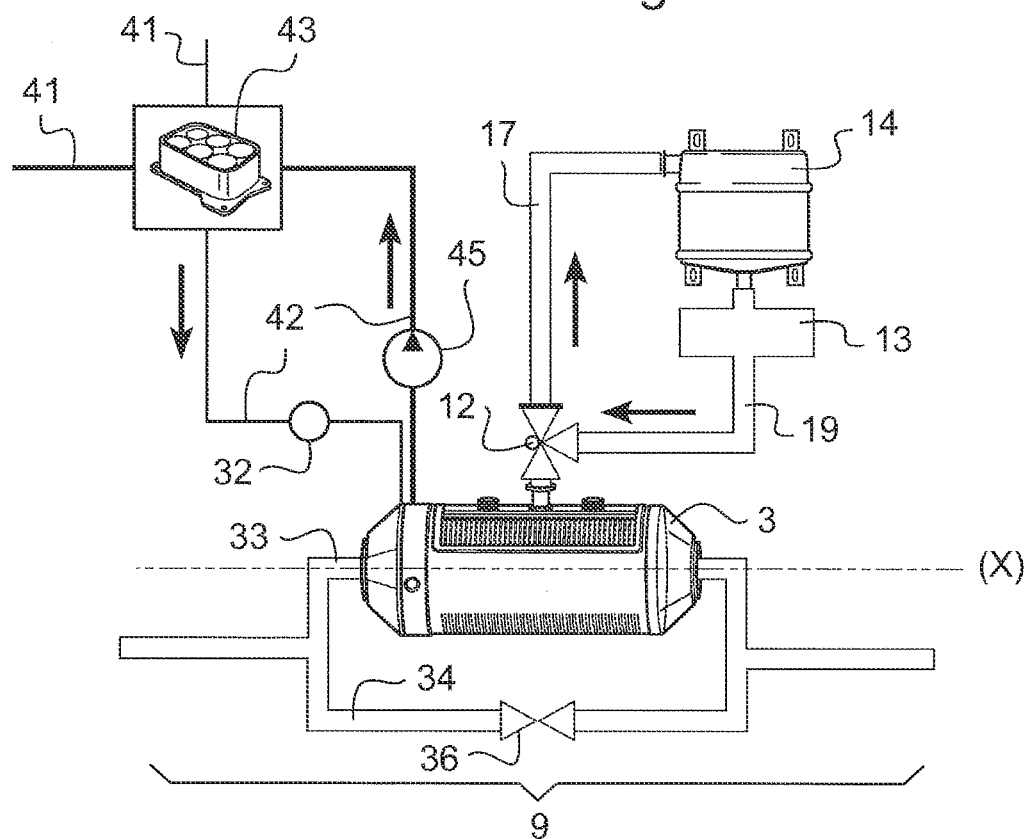
Figure 5:
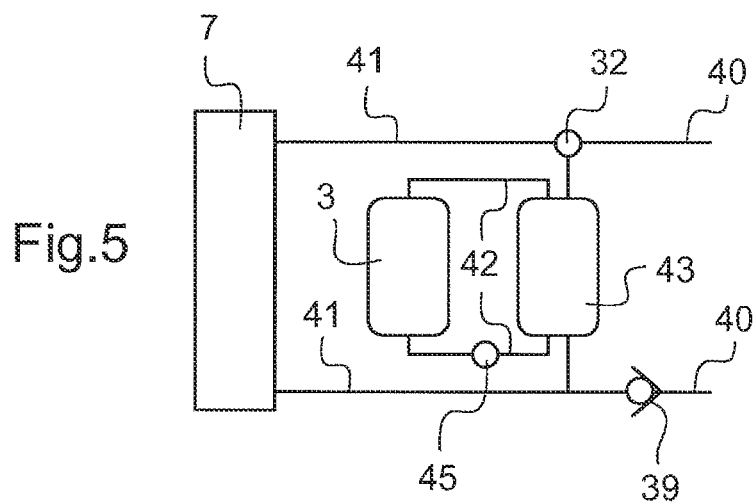

The invention can be better understood from a perusal of the following of a non-restrictive illustrative embodiment thereof and from an examination of the accompanying drawing, in which:

FIG. 1 depicts schematically a vehicle in which a device according to an illustrative embodiment of the invention is integrated, FIG. 2 depicts schematically a device according to a first illustrative embodiment of the invention, FIG. 3 depicts a detail of the device in FIG. 2, FIG. 4 depicts schematically a device according to a second illustrative embodiment of the invention, FIG. 5 depicts a detail of the device in FIG. 4, FIG. 6 depicts an extremity of an example of a reactor.

Depicted in FIG. 1 is a vehicle 1, integrated within which is a device for heating 2 according to an illustrative embodiment of the invention. The device 2 comprises a reactor 3 in which there is disposed a reagent, a circuit 5 for the supply of a reaction fluid to the reactor 3, this fluid reacting with the reagent in an exothermic manner, a circuit 8 for the exchange of heat between the reactor 3 and a component 7 of the vehicle 1 to be heated and a circuit 9 for regenerating the reagent inside the reactor 3.

In the examples described below, the reagent is zeolite and the reaction fluid is a glycol/water solution. Also in the examples described here, the regeneration circuit 9 is flowed through by a regeneration fluid formed by the exhaust gases, so that the regeneration circuit 9 forms a part of the exhaust system of the internal combustion engine of the vehicle. However, the invention is not restricted to these examples.

In the example that will be described, the component 7 of the vehicle is an internal combustion engine of the vehicle. The device 2 is used in this case to heat this engine 7 during start-up.

In variants that are not described here, the device 2 may be utilized to heat one or a plurality of components of the vehicle at times other than during start-up of the engine. The device 2 may, for example, heat one or a plurality of components before start-up of the engine, thereby achieving preconditioning of this or these components 7.

This preconditioning may result from an order given by the user of the vehicle before the user starts the vehicle, for example by depressing a release button for the device 2. As a variant, the preconditioning results from an order generated automatically, for example as a result of the detection of the entry of a user into the vehicle, in particular the insertion of the ignition key, the unlocking of the doors or the opening of a door.

In the case of such preconditioning, the device 2 may thus transfer heat, prior to starting the engine, to a system for defrosting windows, for example the windscreen of the vehicle 1, to the gearbox of the vehicles, in particular for heating the oil thereof, or to the passenger compartment of the vehicle, for the comfort of the one or more users of the vehicle 1.

A number of examples of devices 2 according to the invention will now be described in more detail with reference to FIGS. 2 to 5.

The reactor 3 is present in the example described here in the form of a cylinder having a longitudinal axis X and being of circular section, perpendicular to this axis X. The reactor 3 may comprise an enclosure, into the interior of which the fluid carried by each circuit 5, 8 and 9 may have access.

A compartment arranged inside the enclosure of the reactor 3 receives the reagent, which is zeolite in the example described. The compartment contains, for example, a few kg of zeolite, in particular 2 kg of zeolite, and the latter is present in the example described in the form of balls stacked in the compartment.

The circuit 5 for the supply of reaction fluid comprises a fluid reservoir 13 and a condenser 14 in the example described. The circuit 5 is disposed vertically in relation to the reactor 3 in the example considered here, being above the reactor 3 or positioned at an angle in relation to the latter.

The circuit 5 for the supply of reaction fluid may communicate with the compartment via an access point 12 to the interior of the enclosure. A three-way valve 16 may be disposed between this access point 12 and the circuit 5.

One of the passageways of this valve 16 may communicate with a pipe 17 connected to the condenser 14, another passageway of the valve 16 may communicate with a pipe 19 connected to the reservoir 13, and the third passageway of the valve 16 may communicate with the access point 12.

The pipe 17 may extend vertically and may or may not be disposed along a heating source of the vehicle.

The condenser 14 and the reservoir 13 may be dimensioned as a function of the volume of reaction fluid that it is wished to cause to react with the zeolite. The condenser may be dimensioned, furthermore, in such a way as to possess a condensation power that is compatible with a given period of regeneration of the zeolite, for example less than 20 minutes.

The reservoir 13 has a capacity, for example, that permits a quantity of liquid corresponding by mass to 20% of the anhydrous zeolite contained inside the reactor 3 to be received.

As will be seen in the following, the reaction fluid 5, which consists of a glycol/water solution in the example described, circulates in the pipe 17 in the gaseous phase and in the pipe 19 in the liquid phase.

The circuit 8 for the exchange of heat between the reactor 3 and the component 7 comprises a part extending into the reactor 3 in the example described here. This part extends, for example, between two access points 20 that are diametrically opposed in the enclosure, one of the access points 20 forming an inlet of the said part into the reactor while the other of the access points 20 forms an outlet of the said part.

As depicted in FIG. 6, the access points 20 may be arranged at the level of a longitudinal extremity of the reactor 3. At the level of this longitudinal extremity, the interior of the enclosure may be divided into three regions by two walls 23 and 24 extending parallel to the axis X of the reactor. The first wall 23 surrounds externally a first region 26 communicating with the access point 20 forming the outlet of the exchange fluid from the reactor 3. The second wall 24, radially outside the first wall 23, delimits internally a third region 27 communicating with the access point 20 forming the inlet for the exchange fluid inside the reactor 3.

A second region 28 exists between the walls 23 and 24. This second region does not communicate with any of the access points 20 and may be lacking in exchange fluid.

The first region 26 in the example in FIG. 6 forms an outlet header for the exchange fluid, while the third region 27 forms an inlet header for this fluid. A plurality of bands comprising second pipes may extend along the reactor 3 from holes 30 discharging into the third region 27 as far as holes 31 discharging into the first region 26, these bands having the form of a coil.

A valve 32 may be disposed upstream of the access point 20 connected to the inlet header 27, the status of this valve 32 determining the circulation of the exchange fluid inside the reactor 3. In the example depicted in FIGS. 3 and 5, this valve 32 further permits the exchange fluid to be or not to be directed into a part 40 of the circuit 8 for the exchange of heat bypassing the reactor 3. This part 40 may further comprise a non-return valve 39 in proximity to the place at which the part inside the reactor and the part 40 bypassing the reactor 3 meet.

The reaction fluid entering at the access point 20 upstream of the inlet header 27 may have a temperature linked to the outside temperature. In the examples discussed below, the temperature upstream of the inlet header 27 of the reaction fluid will be respectively −7° C., 0° C. or 20° C., although these values are not restrictive. The exchange fluid passing through the access point 20 downstream of the outlet header 26 may have a temperature in the order of 110° C. when the exothermic reaction occurs inside the reactor 3.

As can be appreciated in FIG. 1, the exchange circuit 8 extends as far as the component 7 to be heated.

The regeneration circuit 9 in the example considered here comprises two parts in parallel 33 and 34. The part 33 passes through the reactor 3, whereas the part 34 bypasses the latter (this part being referred to as a "bypass" in English).

A valve 36 is disposed in the part 34 in the example depicted here and, according to the position of this valve 36, exhaust gases do or do not bypass the reactor 3.

The part 33 may pass through the reactor 3 to the enclosure between two longitudinally opposed access points 35. Between these two access points 35, the part 33 is divided, for example, into a plurality of first pipes passing through the reactor 3 along its longitudinal axis X.

These first pipes may pass through the inlet header 27 or the outlet header 26 described with reference to FIG. 6.

The reagent may be disposed in the gaps of the enclosure that are arranged between the pipes of the circuit 8 for the exchange of heat and the pipes of the regeneration circuit 9 passing through the enclosure, these gaps then forming the compartment of the reactor.

In the example depicted in FIGS. 2 and 3, the circuit 8 for the exchange of heat is flowed through from end to end by the same exchange fluid. In the example described, the component 7 being the heat engine of the vehicle 1, the exchange fluid may be the coolant of the engine. The circuit 8 for the exchange may in this case contain an emptying system that is not depicted here. This emptying system permits the exchange fluid to be prevented from coming into contact with the exhaust gases during regeneration of the zeolite, as explained below. By way of example, when the cooling fluid is an engine coolant such as a glycol/water solution, this fluid is not suitable for withstanding temperatures greater than, or much greater than 130° C. However, the exhaust gases travelling through the part 33 of the regeneration circuit 9 may bring the temperature inside the reactor 3 to a value greater than 130° C. The emptying system prevents the degradation of any exchange fluid that might be present inside the reactor at this moment.

The valve 32 may be a three-way valve and, according to its status, may permit the exchange fluid to reach the reactor 3 or to reach the part 40 of the circuit 8 for the exchange of heat bypassing the reactor 3. When there is no need or little need to reheat the fluid circulating in the circuit 8 for the exchange of heat, the valve 32 may have a status in which all or part of the exchange fluid avoids the reactor 3, by circulating in the part 40 of the circuit 8 for the exchange of heat.

The device which will now be described with reference to FIGS. 4 and 5 differs from that which has been described above in that the exchange circuit 8 is divided into two sub-circuits 41 and 42, each being flowed through by its own exchange fluid.

The two sub-circuits 41 and 42 each pass through the same heat exchanger 43.

The first circuit 41 causes a first exchange fluid to circulate between the exchanger 43 and the engine 7, whereas the second circuit 42 causes a second exchange fluid to circulate between the exchanger 43 and the reactor 1. A transfer of heat between the second exchange fluid and the first exchange fluid takes place inside the heat exchanger 43.

In the example considered here, the first exchange fluid is an engine coolant, for example a glycol/water solution, and the second exchange fluid is a synthetic oil, for example of the type Jarytherm® marketed by the Total® company. This oil in fact resists the high temperatures which may be achieved inside the reactor 3 when the exhaust gases flow through the latter.

Also in the example considered here, the second sub-circuit 42 comprises a pump 45 encouraging the circulation of the second exchange fluid, in such a way as to prevent the second exchange fluid from stagnating inside the reactor, which could lead to a local bubbling of this second exchange fluid.

An example of an operating cycle of the device 2 described above will now be described with reference to any of FIGS. 1 to 6, this cycle comprising according to this example an exothermic reaction stage between the zeolite and the water, a regeneration stage of the zeolite and the water and a resting stage.

When it is wished to cause the zeolite and the water to react together, the valve 12 is brought into a status in which only the transfer of liquid water contained in the reservoir 13 towards the reactor 3 is possible. During this stage, the status of the valve 32 may be controlled in order to permit the passage of a predefined quantity of exchange fluid, or where appropriate a second exchange fluid, into the reactor 3.

The valve 36 may be:

closed, in which case the exhaust gases present in the exhaust system pass through the reactor. This may permit the duration of the following stage of regenerating the zeolite to be reduced, since the temperature increases more rapidly inside the reactor 3 and since, as a consequence, less water will be adsorbed by the zeolite. In this way, there will be less water to be desorbed at the subsequent regeneration stage, which will then be shorter.

open, in order to reduce the losses, in which case the exhaust gases that are present in the exhaust system are divided between the parts 33 and 34.

During this stage, water passes by gravity from the reservoir 13 into the reactor 3, where it is adsorbed by the anhydrous zeolite. As a result of the mass capacity of the zeolite (in the order of 300 kWh per kg of zeolite), a highly exothermic reaction takes place inside the reactor 3. This stage may last for a period of around 2 minutes and power in the order of 15 kW may be released by the reaction during this period.

During this stage, the condenser 14 may see its pressure reduce, while water leaving the condenser via the pipe 19 may have a low temperature, for example in the order of −7° C., 0° C., or even 20° C., according to the exterior temperature. Also during this stage, the temperature inside the reactor 3 may be in the order of 150° C., while the pressure inside the reactor 3 increases as the reaction takes place. The fluid at the outlet from the part of the exchange circuit 8 may have a temperature of around 110° C., whereas its temperature at the inlet to this part may be −7° C., 0° C. or 20° C.

The exchange fluid at the outlet from the reactor 3, where appropriate the second exchange fluid, then travels through the exchange circuit 8 as far as the engine 7 and, where appropriate, gives up its heat to the first exchange fluid circulating as far as the engine 7. The heat is then transmitted to the engine 7, which is thus reheated.

At the end of this stage, all the water that was initially contained in the reservoir 13 may have been adsorbed by the zeolite.

When it is wished to regenerate the zeolite and the water, the valves 12, 32 and 36 of the device 2 may be controlled as follows. The valve 12 has a status permitting communication between the reactor 3 and the pipe 17 connected to the condenser 14 and the absence of communication between the reactor 3 and the pipe 19 connected to the reservoir 13. The valve 32 may have a status preventing the exchange fluid from passing through the reactor 3. Where appropriate, this fluid is evacuated via the emptying system. Where appropriate, the valve 32 may permit the circulation of exchange fluid in the part 40 bypassing the reactor 3 during the regeneration process.

The valve 36 may be closed, so that the exhaust gases flow exclusively through the part 33 inside the reactor 3. As a variant, the valve 36 may be open in order to avoid generating an excessively high temperature inside the reactor 3.

During this stage, the exhaust gases cause the temperature inside the reactor 3 to increase. The pressure increases, and water is desorbed from the pores of the zeolite in which it was present at the end of the preceding stage. The water that is desorbed in the vapor phase may then arrive in the pipe 17 in which it is raised as far as the condenser 14, in which it is condensed and then flows into the reservoir 13, in which it accumulates. This regeneration stage may last for around 20 minutes. The condensation of water generates heat, which may be utilized for heating the passenger compartment of the vehicle 1.

During this regeneration stage, desorbed water may have a temperature of around 110° C., the temperature of the water that is condensed in the condenser may be 40° C., the total pressure inside the condenser 14 may be around 70 mbar, the water partial pressure may be around 70 mbar at that point, the temperature inside the reactor 3 may be around 250° C., the total pressure inside the reactor 3 may be around 70 mbar and the water partial pressure may be around 70 mbar at that point.

In a first variant, during this regeneration stage, the desorbed water may have a temperature of around 110° C., the temperature of the water that is condensed in the condenser 14 may be 20° C., the total pressure inside the condenser 14 may be around 30 mbar, the water partial pressure may be around 30 mbar at that point, the temperature inside the reactor 3 may be around 250° C., the total pressure inside the reactor 3 may be around 30 mbar and the water partial pressure may be around 30 mbar at that point.

In a second variant, during this regeneration stage, the desorbed water may have a temperature of around 110° C., the temperature of the water that is condensed in the condenser 14 may be 10° C., the total pressure inside the condenser 14 may be around 10 mbar, the water partial pressure may be around 10 mbar at that point, the temperature inside the reactor 3 may be around 250° C., the total pressure inside the reactor 3 may be around 10 mbar and the water partial pressure may be around 10 mbar at that point.

At the end of this regeneration stage, the device 2 is at rest. When at rest, the valves 12, 32 and 36 of the device may have the following status.

The valve 12 prevents all communication between the circuit 5 for the supply of reaction fluid and the reactor 3. The valve 32 permits the circulation of the exchange fluid and, where appropriate, the second exchange fluid, inside the reactor 3. The valve 36 is open, permitting all or part of the exhaust gases to bypass the reactor 3.

During this resting stage, the temperature of the water in the condenser may fall to around 20° C., the total pressure in the condenser 14 and the water partial pressure in the condenser may fall to 20 mbar, the temperature inside the reactor 3 may be around 20° C., the total pressure inside the reactor 3 and the water partial pressure inside the reactor may be lower than 0.1 mbar.

According to the first variant above, during this resting stage, the temperature of the water in the condenser may fall to around 0° C., the total pressure in the condenser 14 and the water partial pressure in the condenser may fall to 8 mbar, the temperature inside the reactor 3 may be around 0° C., the total pressure inside the reactor 3 and the water partial pressure inside the reactor may be lower than 0.1 mbar.

According to the second variant above, during this resting stage, the temperature of the water in the condenser may fall to around −7° C., the total pressure in the condenser 14 and the water partial pressure in the condenser may fall to 2 mbar, the temperature inside the reactor 3 may be around −7° C., the total pressure inside the reactor 3 and the water partial pressure inside the reactor may be lower than 0.1 mbar.

The invention is not restricted to the examples described above.

The invention claimed is:

1. A device for heating a heat engine of a vehicle, comprising:
   a reactor, in which a reagent with an ability to bring about an exothermic reaction with a reaction fluid is disposed;
   a circuit for supplying reaction fluid to the reactor;
   a circuit for exchanging heat between the reactor and the heat engine of the vehicle, said circuit permitting to transfer heat from the exothermic reaction to the heat engine; and
   a circuit for regenerating the reagent,
   the circuit for exchanging heat and the circuit for regenerating the reagent being separate and each comprising a part extending into the reactor.

2. The device as claimed in claim 1, the reagent being zeolite and the reaction fluid being water.

3. The device as claimed in claim 1, the circuit for regenerating the reagent forming a part of an exhaust system of the engine.

4. The device as claimed in claim 1, the circuit for regenerating the reagent comprising, in parallel with the part extending into the reactor, a part bypassing the reactor.

5. The device as claimed in claim 1, the circuit for exchanging heat being flowed through by a single exchange fluid.

6. The device as claimed in claim 5, the exchange fluid or one of the exchange fluids being a coolant of the engine.

7. The device as claimed in claim 1, the circuit for exchanging heat comprising two sub-circuits separated by a heat exchanger, a first exchange fluid circulating in a first sub-circuit between the device and the said heat exchanger, and a second exchange fluid circulating in a second sub-circuit between the reactor and the said heat exchanger.

8. The device as claimed in claim 1, the circuit for supplying the reaction fluid being dedicated for supplying reaction fluid to the reagent inside the reactor.

9. A method for heating a heat engine of a vehicle, wherein the heat engine of the vehicle is heated using a device comprising:
   a reactor, in which a reagent with an ability to bring about an exothermic reaction with a reaction fluid is disposed;
   a circuit for supplying reaction fluid to the reactor;
   a circuit for exchanging heat between the reactor and the heat engine of the vehicle, said circuit permitting to transfer heat from the exothermic reaction to the heat engine; and
   a circuit for regenerating the reagent,
   the circuit for exchanging heat and the circuit for regenerating the reagent being separate and each comprising a part extending into the reactor,
   the method comprising:
   supplying reaction fluid to the reagent inside the reactor in such a way as to bring about an exothermic reaction inside the reactor; and
   transferring heat released by the exothermic reaction to the heat engine using the circuit for exchanging heat.

10. The method as claimed in claim 9, in which the reagent is regenerated after the exothermic reaction by causing exhaust gases to circulate in the regeneration circuit.

11. The method as claimed in claim 9, wherein the method is performed to heat the heat engine of the vehicle when the vehicle starts.

12. The method as claimed in claim 9, wherein the method is performed to heat the heat engine before the vehicle starts.

* * * * *